UNITED STATES PATENT OFFICE.

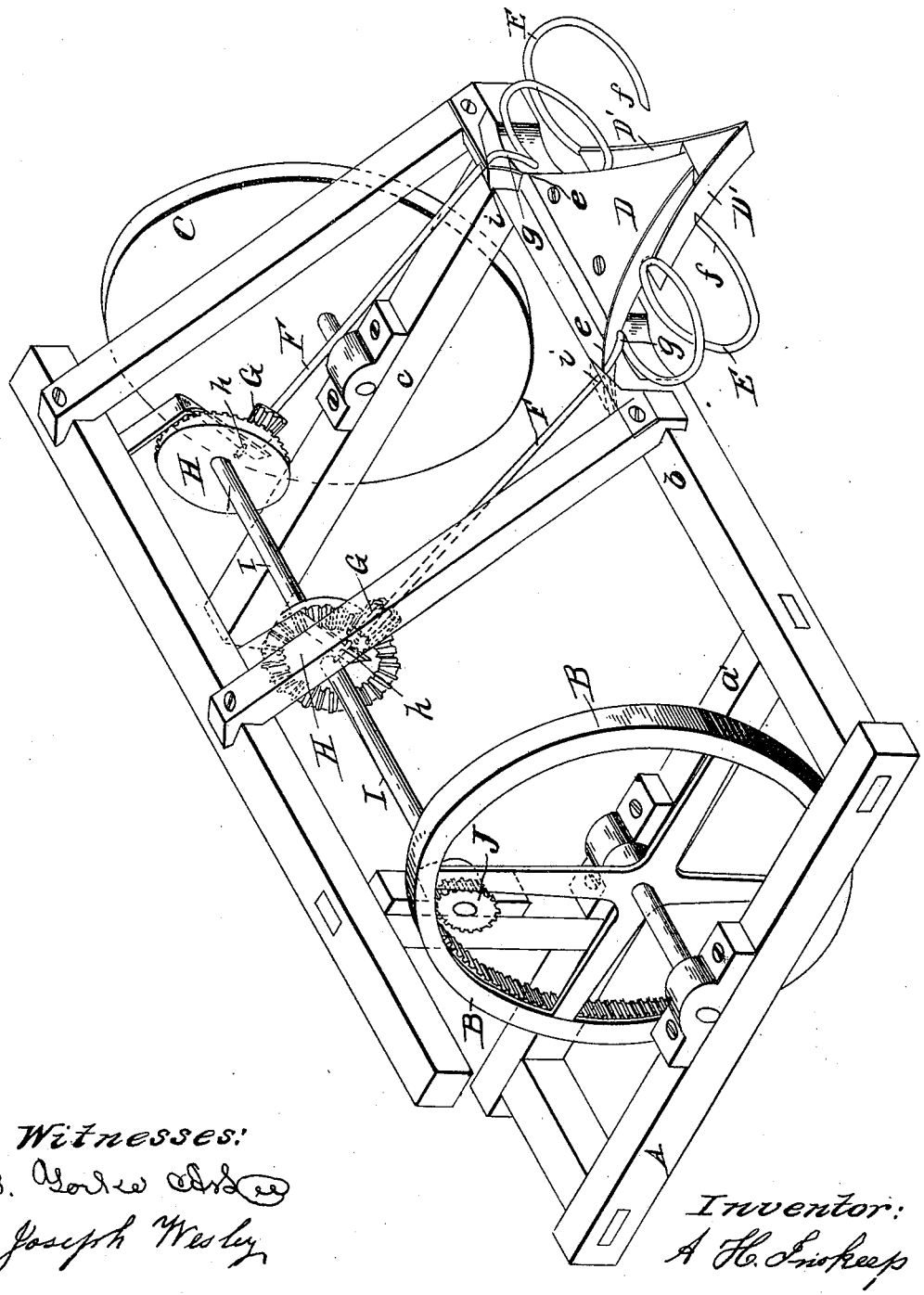

A. H. INSKEEP, OF MIDDLEBURG, OHIO.

IMPROVEMENT IN HARVESTING-MACHINES.

Specification forming part of Letters Patent No. 25,415, dated September 13, 1859.

*To all whom it may concern:*

Be it known that I, A. H. INSKEEP, of Middleburg, in the county of Logan and State of Ohio, have invented a new and useful Improvement in Harvesting-Machines; and I do hereby declare that the following is a full, clear, and exact description of the same, reference being had to the accompanying drawing, forming a part of this specification, in which a perspective view of a harvester constructed with my improvement is shown.

The nature of my invention consists, first, in arranging a spirally-constructed device of cone configuration in front of the platform, so that in its revolution it is capable of seizing and drawing in the grain toward its apex, so that it may be cut by ordinary auxiliary cutters, or by an edge formed on the terminating spiral of the seizing and drawing-in device or gatherer itself, acting in concert with a stationary edge or knife, substantially as hereinafter described.

It consists, second, in the combination of the said spirally-constructed device with a divider having guards arranged so that such grain as may not stand straight, and consequently would not be seized by the spiral device, shall by the combined agency of the divider and spirally-constructed device be carried to the cutting-point, substantially as hereinafter described.

To enable others skilled in the art to make and use my invention, I will proceed to describe its construction and operation.

A represents the frame of the harvester, B the internally-geared driving-wheel, and C the off-side wheel.

In the drawing I have not represented the platform; but it is intended to employ a stationary platform and a raking device, or an endless apron which travels at right angles to the line of draft. This platform is to be located in the space between the timbers *a b c* of the frame, and is to receive the grain as it falls from the cutting device in the ordinary manner.

D is a divider, of V form, with its sides slightly concave, so as to be adapted to the shape of the seizing and drawing-in devices. The side edges of this divider are bound with thin metal plates *d d*, which terminate near the rear ends in sharp cutting-edges *e e;* and guards D' D', standing out from the sides of the divider to insure the seizing of the grain by the hook or sickle end of the drawing-in devices, are provided, as shown in the drawing.

E E are two of my seizing and drawing-in devices. They are formed by bending a metal rod or bar spirally, so as to form the skeleton of a cone, the apex of which terminates in a shaft, F, and the base in a hook or sickle, *f*. The first or apex spirals of the devices E E are preferably made sharp, as shown at *g g*, so as to act in concert with the stationary cutting-edges *e e* for cutting down the grain. These spirals, however, may be made blunt and the stationary cutting-edges *e e* dispensed with, and ordinary shear-cutters, arranged in suitable relation to the apex of the devices E E, employed to cut down the grain. On each side of the divider, which is set considerably inclined from the horizon, is arranged one of the seizing and drawing-in devices E, so that every part of the same shall clear the divider, and yet in its revolution nearly touch the same from apex to base. The shafts F F of the devices E E are set at about the same inclination with the divider as represented, and their shafts F F are supported in bearings *h i*, as shown. By having the divider arranged between the devices E E and furnished with guards D' D', in case the grain should be bent over so as not to be correctly seized by the hook or sickle ends of the divider, so as always to come within the circle of the spirals of the devices E E, it thus will be compelled to come in contact with the cutters and be cut down.

To impart motion to the devices E E, a bevel-wheel, G, is arranged on the upper end of each of the shafts. These bevel-wheels gear into larger bevel-wheels, H, which are arranged on a transverse shaft, I, said shaft having a pinion, J, on its outer end, which gears into the teeth of the internally-toothed driving-wheel B, as shown.

In the drawing I have represented but one divider and two seizing and drawing-in devices, E E; but of course in practice a series may be employed along the whole front of the machine.

From the above description of parts it will be evident, if the machine is moved forward and the devices E E made to revolve, that the grain will be seized by the hook or sickle ends of the spirally-constructed devices E E, owing to the guards keeping the grain some distance off from the edge of the divider, or within the circle of the spiral, and by their succeeding spirals will be drawn or forced up to their apexes, and either cut down by the sharp edges of the apex-spirals and the stationary cutters e e or by an auxiliary shear or other suitable cutting device, so as to be capable of falling upon the platform or endless traveling apron.

It is obvious that a plain V-divider without guards may be used in combination with the devices E E. In this case the grain which may not stand straight and not come within the circle of the sickle-point of said devices will be drawn up to the cutting-edges by means of the outer circumference of the spirals and the beveled-edges of the divider.

I do not claim the revolving cone-shaped spiral gatherer placed in advance of the cutter for gathering and drawing in the grain to the stationary cutters, when constructed and employed in the manner described in the English patent of Wm. Burgess, August 16, 1854; but What I do claim as my invention, and desire to secure by Letters Patent, is—

1. The arrangement of the revolving spiral cone-shaped cutter or gatherer, with the base of the cone in front, to gather up and draw the grain back to either stationary or reciprocating cutters, substantially as described, for the purpose specified.

2. The combination of the spirally-formed gatherer or cutter, arranged as described, with the divider D, guards D' D', and stationary cutters e, substantially as described, for the purpose specified.

A. H. INSKEEP.

Witnesses:
G. YORKE ATLEE,
MUNN & Co.